(12) United States Patent
Hirayama et al.

(10) Patent No.: US 11,674,287 B2
(45) Date of Patent: Jun. 13, 2023

(54) SYSTEM AND METHOD FOR PLANNING TRAVEL PATH FOR WORK MACHINE, AND WORK MACHINE

(71) Applicant: KOMATSU LTD., Tokyo (JP)

(72) Inventors: Masami Hirayama, Kensington (AU); Jose Guivant, Kensington (AU); Jayantha Katupitiya, Kensington (AU); Mark Whitty, Kensington (AU)

(73) Assignee: KOMATSU LTD., Tokyo (JP)

( * ) Notice: Subject to any disclaimer, the term of this patent is extended or adjusted under 35 U.S.C. 154(b) by 787 days.

(21) Appl. No.: 16/335,451

(22) PCT Filed: Dec. 10, 2018

(86) PCT No.: PCT/JP2018/045313
§ 371 (c)(1),
(2) Date: Mar. 21, 2019

(87) PCT Pub. No.: WO2019/176193
PCT Pub. Date: Sep. 19, 2019

(65) Prior Publication Data
US 2021/0363727 A1    Nov. 25, 2021

(30) Foreign Application Priority Data

Mar. 15, 2018   (JP) .............................. JP2018-048608

(51) Int. Cl.
*G01C 21/36* (2006.01)
*H04W 4/40* (2018.01)
(Continued)

(52) U.S. Cl.
CPC ....... *E02F 9/2045* (2013.01); *B60W 60/0011* (2020.02); *B60W 60/0023* (2020.02);
(Continued)

(58) Field of Classification Search
CPC ......... B60W 60/0023; B60W 60/0011; B60W 2300/17; B60W 2300/44; E02F 9/2045;
(Continued)

(56) References Cited

U.S. PATENT DOCUMENTS

| 5,950,141 A | 9/1999 | Yamamoto et al. |
| 6,247,538 B1 | 6/2001 | Takeda et al. |

(Continued)

FOREIGN PATENT DOCUMENTS

| JP | 58-26130 A | 2/1983 |
| JP | 9-209393 A | 8/1997 |

(Continued)

OTHER PUBLICATIONS

The International Search Report for the corresponding international application No. PCT/JP2018/045313, dated Mar. 12, 2019.

*Primary Examiner* — James J Lee
*Assistant Examiner* — Wenyuan Yang
(74) *Attorney, Agent, or Firm* — Global IP Counselors, LLP

(57) ABSTRACT

A controller obtains topographical data indicative of the topography of a work site. The controller obtains material data indicative of the position of a material. The controller computes an evaluation function based on the material data for each of a plurality of candidates of the travel path to be decided from the topographical data. The evaluation function includes a material function pertaining to an amount of (Continued)

the material. The controller decides a candidate having a smallest evaluation function of the plurality of candidates as the travel path.

23 Claims, 15 Drawing Sheets

(51) Int. Cl.
    *G01S 17/08*         (2006.01)
    *G01S 17/89*         (2020.01)
    *G06K 9/00*          (2022.01)
    *E02F 9/20*          (2006.01)
    *B60W 60/00*        (2020.01)
    *E02F 9/26*          (2006.01)
    *G05D 1/02*         (2020.01)
    *E02F 3/76*          (2006.01)
    *E02F 3/84*          (2006.01)
(52) U.S. Cl.
    CPC .............. *E02F 9/205* (2013.01); *E02F 9/261* (2013.01); *G05D 1/0214* (2013.01); *B60W 2300/17* (2013.01); *B60W 2300/44* (2013.01); *E02F 3/7609* (2013.01); *E02F 3/841* (2013.01); *G05D 2201/0202* (2013.01)
(58) Field of Classification Search
    CPC ......... E02F 9/205; E02F 9/261; E02F 3/7609; E02F 3/841; G05D 1/0214; G05D 2201/0202
    See application file for complete search history.

(56) References Cited

U.S. PATENT DOCUMENTS

| | | | | |
|---|---|---|---|---|
| 6,845,311 | B1* | 1/2005 | Stratton | E02F 3/847 |
| | | | | 340/870.16 |
| 9,481,964 | B1* | 11/2016 | Marsolek | G01S 19/14 |
| 2007/0150133 | A1* | 6/2007 | Sudou | G05D 1/0272 |
| | | | | 701/23 |
| 2014/0214237 | A1* | 7/2014 | Kini | E02F 9/205 |
| | | | | 701/2 |
| 2016/0076224 | A1* | 3/2016 | Edara | E02F 9/2029 |
| | | | | 701/50 |
| 2016/0076893 | A1* | 3/2016 | Wei | G01C 21/34 |
| | | | | 701/410 |
| 2016/0077514 | A1* | 3/2016 | Taylor | E02F 9/262 |
| | | | | 700/173 |
| 2018/0258610 | A1* | 9/2018 | Elkins | B60W 10/30 |
| 2020/0240111 | A1* | 7/2020 | Saiki | E02F 9/2045 |

FOREIGN PATENT DOCUMENTS

| | | |
|---|---|---|
| JP | 10-88625 A | 4/1998 |
| JP | 10-212035 A | 8/1998 |
| JP | 2007-164279 A | 6/2007 |
| JP | 2011-237339 A | 11/2011 |
| JP | 5601878 B2 * | 10/2014 |
| WO | 2019/008767 A1 | 1/2019 |

* cited by examiner

SYSTEM AND METHOD FOR PLANNING TRAVEL PATH FOR WORK MACHINE, AND WORK MACHINE

CROSS-REFERENCE TO RELATED APPLICATIONS

This application is a U.S. National stage application of International Application No. PCT/JP2018/045313, filed on Dec. 10, 2018. This U.S. National stage application claims priority under 35 U.S.C. § 119(a) to Japanese Patent Application No. 2018-048608, filed in Japan on Mar. 15, 2018. The entire contents of which are hereby incorporated herein by reference.

BACKGROUND

Field of the Invention

The present invention relates to a system for planning a travel path for a work machine, a method, and a work machine.

Background Information

A work machine performs work on material at a work site. The material is ore or earth and the like excavated at a work site such as a mine. For example, dumping work involves transporting the material as far as the precipice of a dumping area and discharging the material to the bottom of the precipice. In dumping work, the material is accumulated in the dumping area and the accumulated material is pushed off from the precipice by a work machine such as a bulldozer, and falls down to the bottom of the precipice.

SUMMARY

The total amount of the material accumulated in the dumping area often exceeds the maximum capacity that can be carried by the blade of the work machine. In addition, there is a gap between the material accumulated in the dumping area and the edge of the precipice of the dumping area. Therefore, the dumping work may require repeatedly performing the work of shaving off a portion of the accumulated material with the work machine and then causing the work machine to travel to the edge of the precipice and push the shaved off material from the edge.

However, because the contour of the edge of the precipice is not uniform, distances between the material and the edge differ according to the location. Therefore, work efficiency is affected by what travel path the work machine is caused to travel along. While an experienced operator uses his experience to figure out which travel path to use for driving the work machine, it is not easy for an inexperienced operator to determine a travel path that is efficient.

An object of the present invention is to suitably decide, with a controller, a travel path for efficiently performing work with a work machine on a material at a work site.

A first aspect is a system for planning a travel path of a work machine for working on a material at a work site, the system including a controller. The controller is programmed to execute the following processing. The controller obtains topographical data which indicates the topography of the work site. The controller obtains material data which indicates the position of the material. The controller computes an evaluation function based on the material data for each of a plurality of candidates of the travel path to be decided from the topographical data. The evaluation function includes a material function pertaining to the amount of the material. The controller decides the candidate having the smallest evaluation function among the plurality of candidates as the travel path.

A second aspect is a method executed by a controller for planning a travel path of a work machine for working on a material at a work site, the method including the following processes. A first process is obtaining topographical data which indicates the topography of the work site. A second process is obtaining material data which indicates the position of the material. A third process is computing, on the basis of the material data, an evaluation function on each of a plurality of candidates of travel path to be decided from the topographical data. The evaluation function includes a material function pertaining to the amount of the material. A fifth process is deciding the candidate having the smallest evaluation function among the plurality of candidates as the travel path.

A third aspect is a work machine, the work machine including a controller for planning a travel path of the work machine for working on a material at a work site. The controller is programmed to execute the following processing. The controller obtains topographical data which indicates the topography of the work site. The controller obtains material data which indicates the position of the material. The controller computes an evaluation function on each of a plurality of candidates of travel path to be decided from the topographical data. The evaluation function includes a material function pertaining to the amount of the material. The controller decides the candidate having the smallest evaluation function among the plurality of candidates as the travel path.

According to the present invention, the candidate having the smallest evaluation function among a plurality of travel path candidates is decided as the travel path by the controller. The evaluation function includes a material function pertaining to the amount of the material. As a result, a travel path for efficiently performing work on the material can be suitably decided by the controller.

DETAILED DESCRIPTION OF EMBODIMENT(S)

Figure 1:
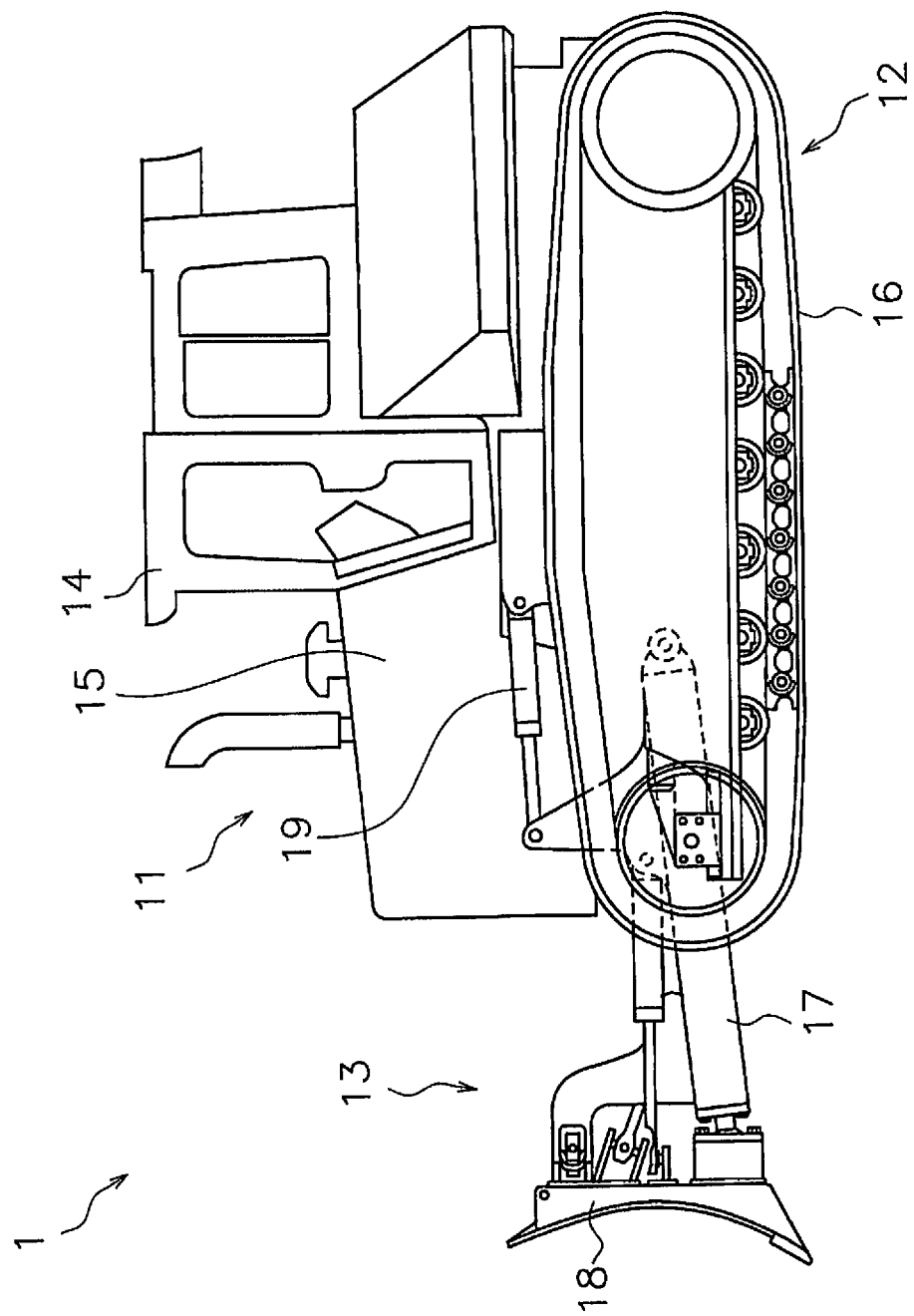
FIG. 1 is a side view of a work machine according to an embodiment.

A work machine 1 according to an embodiment is discussed hereinbelow with reference to the drawings. FIG. 1 is a side view of the work machine 1 according to an embodiment. The work machine 1 according to the present embodiment is a bulldozer. The work machine 1 includes a vehicle body 11, a travel device 12, and a work implement 13.

The vehicle body 11 includes an operating cabin 14 and an engine room 15. An operator's seat that is not illustrated is disposed inside the operating cabin 14. The engine room 15 is disposed in front of the operating cabin 14. The travel device 12 is attached to a bottom part of the vehicle body 11. The travel device 12 includes a pair of left and right crawler belts 16. Only the crawler belt 16 on the left side is illustrated in FIG. 1. The work machine 1 travels due to the rotation of the crawler belts 16.

The work implement 13 is attached to the vehicle body 11. The work implement 13 includes a lift frame 17, a blade 18, and a lift cylinder 19. The lift frame 17 is attached to the vehicle body 11 in a manner that allows movement up and down. The lift frame 17 supports the blade 18.

The blade 18 is disposed in front of the vehicle body 11. The blade 18 moves up and down accompanying the up and down movements of the lift frame 17. The lift cylinder 19 is coupled to the vehicle body 11 and the lift frame 17. Due to the extension and contraction of the lift cylinder 19, the lift frame 17 rotates up and down.

Figure 2:
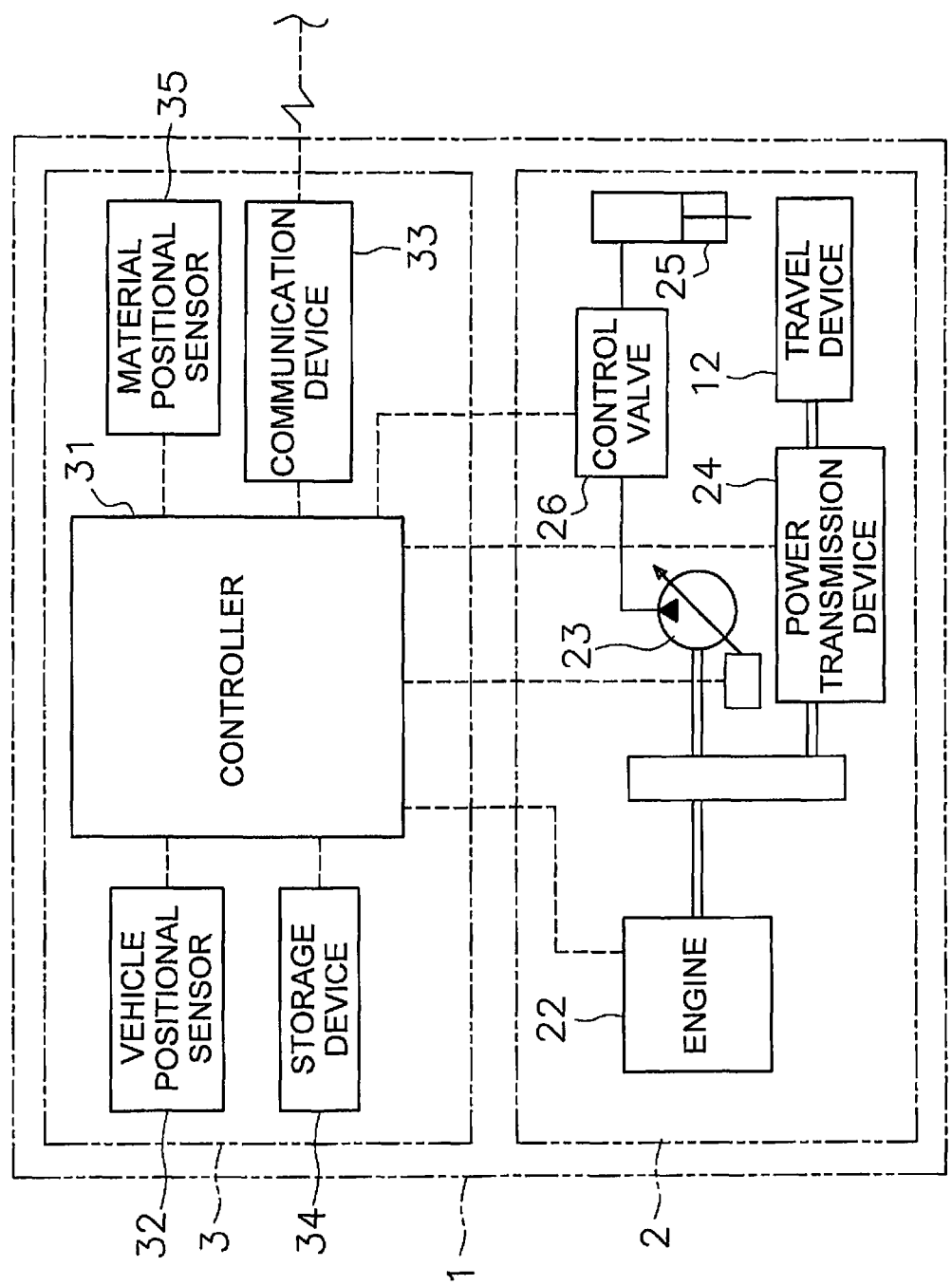
FIG. 2 is a block diagram illustrating a configuration of a drive system and a control system of the work machine.

FIG. 2 is a block diagram illustrating a configuration of a drive system 2 and a control system 3 of the work machine 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to a hydraulic actuator 25. For example, the hydraulic actuator 25 includes the abovementioned lift cylinder 19. While only one hydraulic pump 23 is illustrated in FIG. 2, a plurality of hydraulic pumps may be provided.

A control valve 26 is disposed between the hydraulic actuator 25 and the hydraulic pump 23. The control valve 26 is a proportional control valve and controls the flow rate of the hydraulic fluid supplied from the hydraulic pump 23 to the lift cylinder 19. The control valve 26 may also be a pressure proportional control valve. Alternatively, the control valve 26 may be an electromagnetic proportional control valve.

The power transmission device 24 transmits driving power from the engine 22 to the travel device 12. The power transmission device 24 may be a hydrostatic transmission (HST), for example. Alternatively, the power transmission device 24, for example, may be a transmission having a torque converter or a plurality of speed change gears.

The control system 3 includes a controller 31, a vehicle positional sensor 32, a communication device 33, a storage device 34, and a material positional sensor 35. The controller 31 is programmed so as to control the work machine 1 on the basis of obtained data. The controller 31 includes, for example, a processor such as a CPU. The communication device 33 is, for example, a module for wireless communication and communicates with apparatuses outside of the work machine 1.

The vehicle positional sensor 32 detects the position of the work machine 1. The vehicle positional sensor 32 includes, for example, a global navigation satellite system (GNSS) receiver such as a global positioning system (GPS). The vehicle positional sensor 32 is mounted on the vehicle body 11. Alternatively, the vehicle positional sensor 32 may be mounted in another position such as on the work implement 13. The controller 31 obtains current position data, which indicates the current position of the work machine 1, from the vehicle positional sensor 32.

The material positional sensor 35 measures the position and shape of a material in the vicinity of the work machine 1 and outputs material data which indicates the position and shape of the material. The material positional sensor 35 is mounted on the vehicle body 11. Alternatively, the material positional sensor 35 may be mounted in another position such as on the work implement 13. Specifically, the material positional sensor 35 measures the distance from the work machine 1 of a plurality of measurement points on the surface of the material. The positions of the measurement points are derived from the distances of the measurement points from the work machine 1.

In the present embodiment, the material positional sensor 35 is a laser imaging detection and ranging (LIDAR) device. The material positional sensor 35 measures the distances to the measurement points by irradiating a laser and measuring the reflected light therefrom. However, the material positional sensor 35 may be a device other than a LIDAR device. For example, the material positional sensor 35 may include a camera and may perform surveying with image data of the work site. The material positional sensor 35, for example, may be device mounted on an unmanned aerial vehicle (UAV) and may perform aerial surveying.

The storage device 34 includes, for example, a memory and an auxiliary storage device. The storage device 34 may be a RAM or a ROM, for example. The storage device 34 may be a semiconductor memory or a hard disk and the like. The storage device 34 is an example of a non-transitory computer-readable recording medium. The storage device 34 records computer commands that are executable by the processor and that are for controlling the work machine 1. In addition, the storage device 34 records data obtained from external apparatuses via the communication device 33.

The controller 31 outputs command signals to the engine 22, the hydraulic pump 23, the power transmission device 24, and the control valve 26, thereby controlling said devices. For example, the controller 31 controls the displacement of the hydraulic pump 23 and the opening degree of the control valve 26 to operate the hydraulic actuator 25. Consequently, the work implement 13 can be operated.

The controller 31 controls the rotation speed of the engine 22 and controls the power transmission device 24 to cause the work machine 1 to travel. For example, when the power transmission device 24 is an HST, the controller 31 controls the displacement of the hydraulic pump and the displacement of a hydraulic motor of the HST. When the power transmission device 24 is a transmission having a plurality of speed change gears, the controller 31 controls the actuators for gear shifting. In addition, the controller 31 controls the power transmission device 24 so as to bring about a speed difference between the left and right crawler belts 16, thereby causing the work machine 1 to turn.

Automatic control of the work machine 1 executed by the controller 31 will be explained next. The controller 31 controls the engine 22 and the power transmission device 24 to cause the work machine 1 to travel automatically. Moreover, the controller 31 controls the engine 22, the hydraulic pump 23, and the control valve 26, thereby automatically controlling the work implement 13.

Figure 3:
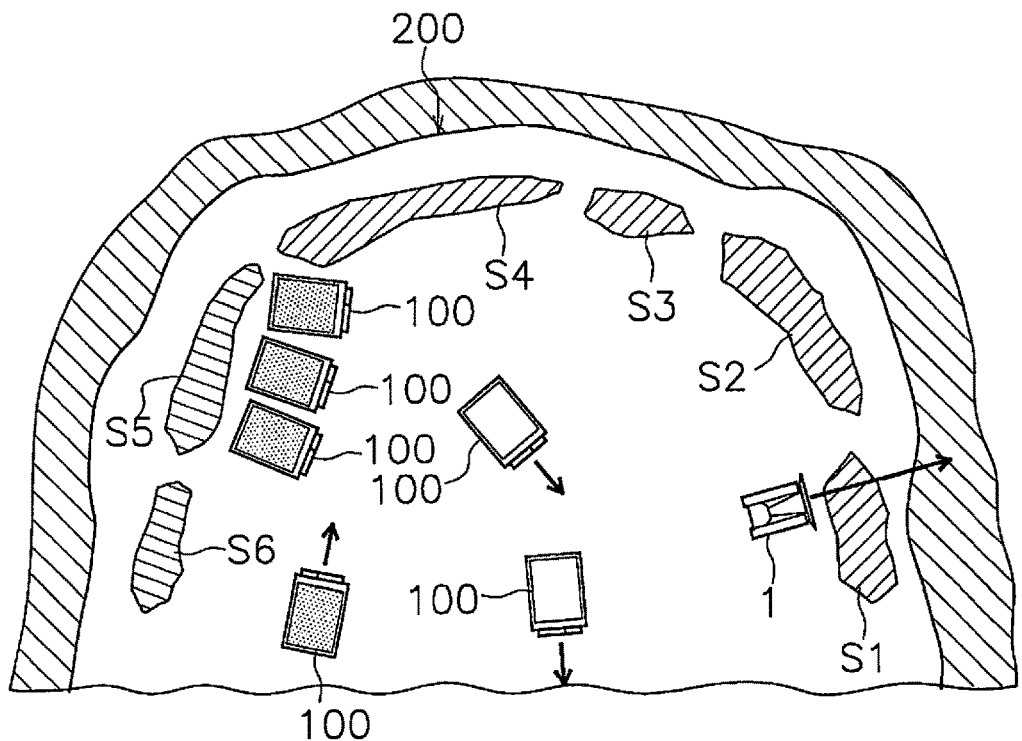
FIG. 3 is a view of a dumping area from above.
Figure 4:
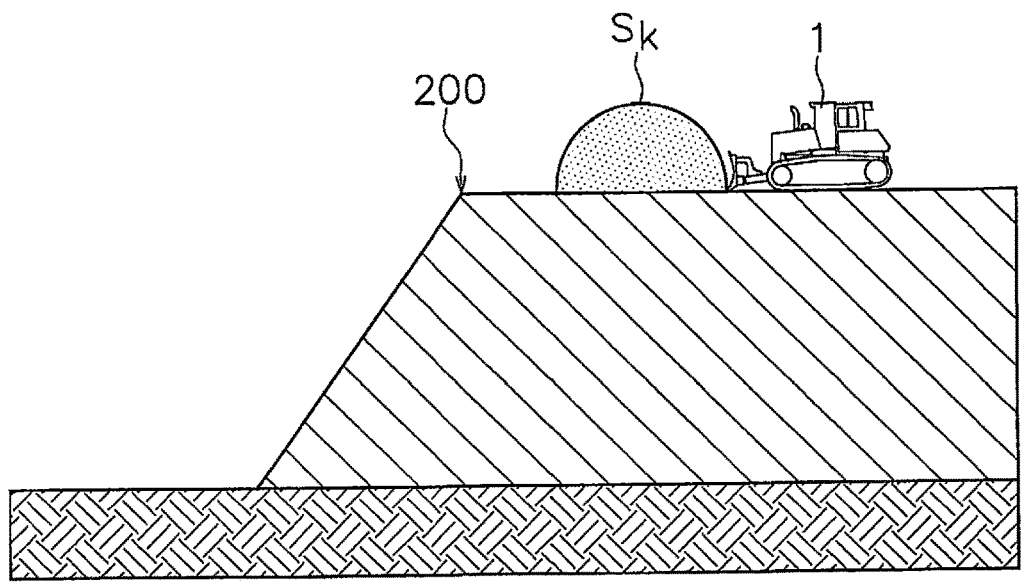
FIG. 4 is a view of the dumping area from the side.

The following is an explanation of the automatic control of the dumping work as an example of work performed by the work machine 1 at a work site. FIG. 3 is a view of a dumping area of the work site from above. FIG. 4 is a view of the dumping area from the side. As illustrated in FIG. 3, a conveying means 100 such as a dump truck conveys and discharges a material such as earth in the vicinity of the edge 200 of a precipice of the dumping area. As a result, piles of accumulated material $S_k$ (k=1, 2, 3 . . . ) are arranged near the edge 200 of the dumping area. The dumping work is work that involves the work machine 1 shaving off a portion of a pile of the material Sk with the blade 18 and pushing the material Sk off from the edge 200 of the dumping area so that the material Sk falls downward.

Figure 5:
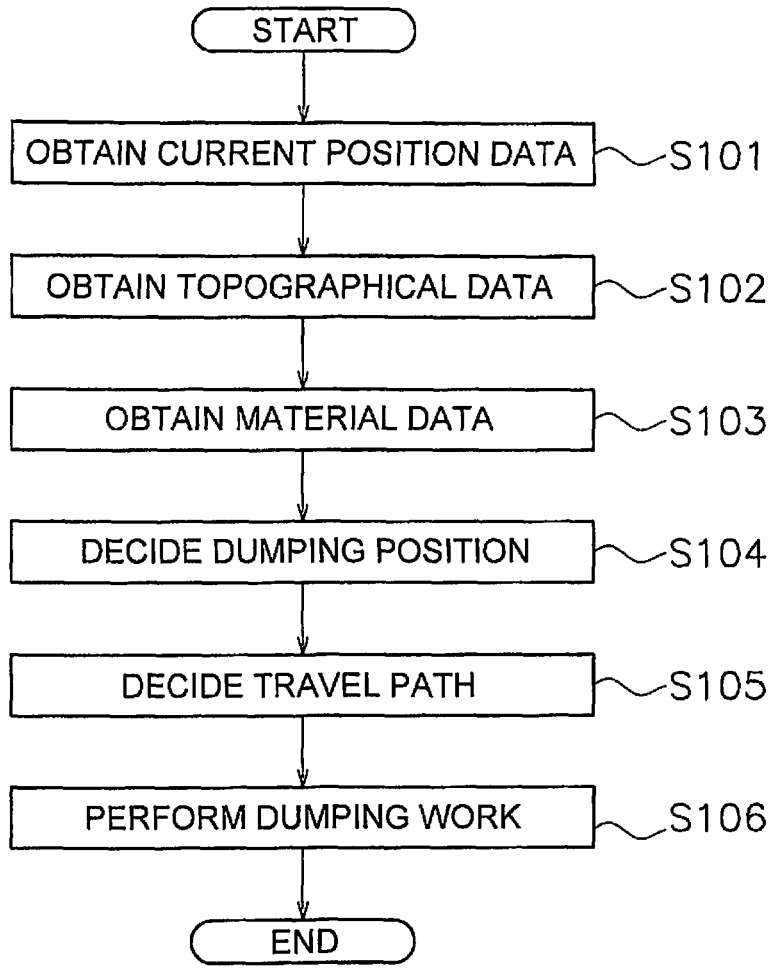
FIG. 5 is a flow chart illustrating automatic control processing of the work machine.

FIG. 5 is a flow chart illustrating automatic control processing of the work machine 1. As illustrated in FIG. 5, the controller 31 obtains current position data in step S101. The controller 31 obtains the current position data from the vehicle positional sensor 32.

Figure 6:
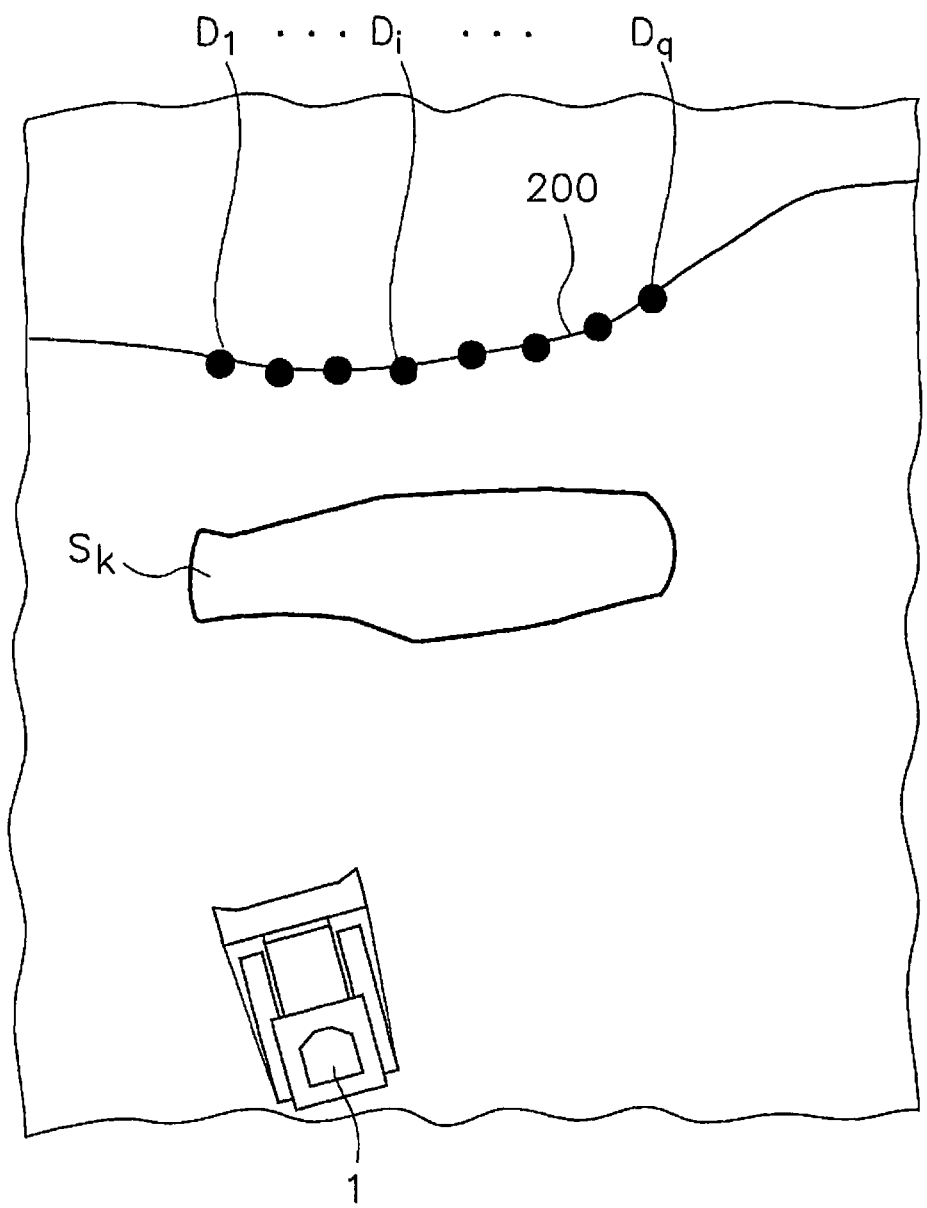
FIG. 6 is a view of examples of dumping area data and material data.

In step S102, the controller 31 obtains topographical data. The topographical data is data that indicates the topography of the work site. As illustrated in FIG. 6, the topographical data includes the contour and position of the edge 200 of the dumping area. For example, the contour of the dumping area is represented by a polygon approximation. The controller 31 may obtain the topographical data by surveying the dumping area with the material positional sensor 35. Alternatively, the controller 31 may obtain, via the communication device 33, the topographical data surveyed by an external apparatus.

In step S103, the controller 31 obtains the material data. As illustrated in FIG. 6, the material data depicts a three-dimensional shape and position of the material $S_k$ at the dumping area. For example, the shape of the material $S_k$ is represented by a polygon approximation. The controller 31 obtains the material data from the material positional sensor 35.

In step S104, the controller 31 decides a dumping position $D_i$ (i=1, 2, . . . , q). The controller 31 decides a plurality of dumping positions $D_i$ along the edge 200 of the dumping area. For example, the controller 31 decides positions at certain distances along the edge 200 of the dumping area as each of the dumping positions $D_i$.

Figure 7:
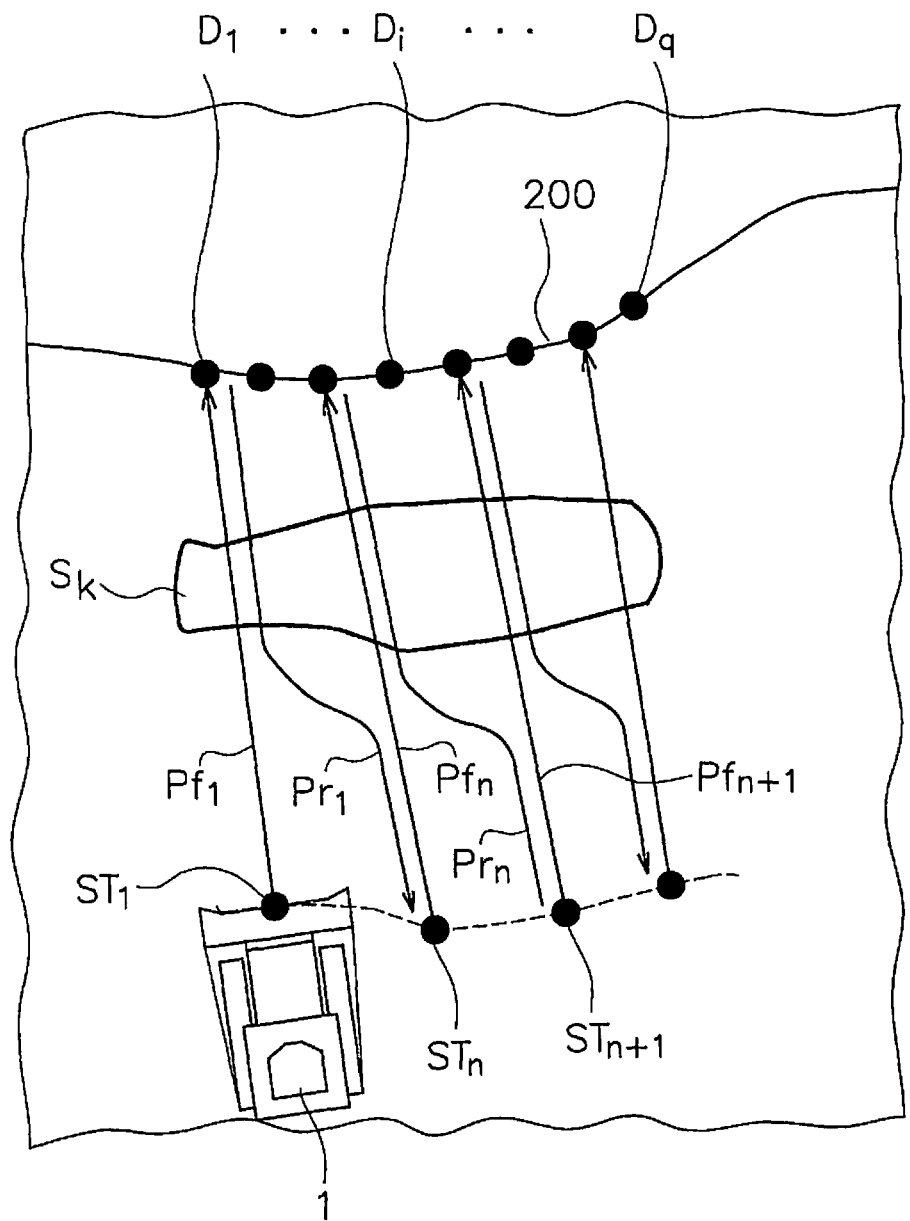
FIG. 7 illustrates an example of travel paths.

In step S105, the controller 31 decides a travel path. FIG. 7 illustrates an example of travel paths. As illustrated in FIG. 7, the controller 31 decides travel paths for dumping all of the material $S_k$.

Each travel path includes a forward path $Pf_n$ (n=1, 2 . . . ) and a reverse path $Pr_n$. The work machine 1 dumps the material $S_k$ by repeating the forward travel along the forward paths $Pf_n$ and the reverse travel along the reverse paths $Pr_n$. The forward path $Pf_n$ is a straight line from a starting position $ST_n$ of each forward path $Pf_n$ to a dumping position $D_i$. The starting end of each forward path $Pf_n$ is the starting position $ST_n$, and the terminating end is the dumping position $D_i$. The forward path $Pf_n$ is orthogonal to the edge 200 of the dumping area. However, as indicated below, the angle of the forward path $Pf_n$ to the edge 200 of the dumping area may deviate from a perpendicular line within a range of a permissible predetermined angle.

The controller 31 decides the forward paths $Pf_n$ according to a belowmentioned path planning method. However, the controller 31 decides the reverse path $Pr_n$ in accordance with the decided forward path $Pf_n$ and the shape of the material $S_k$. The controller 31 decides the reverse path $Pr_n$ so as to cause the work machine 1 to travel straight in reverse from the dumping position Di and to cause the work machine 1 to, at a point after passing through the material $S_k$, turn toward a starting point $ST_{n+1}$ of the next forward path $Pf_{n+1}$. The reverse path $Pr_n$ is a path that links the terminating end of the forward path $Pf_n$ and the starting end of the forward path $Pf_{n+1}$. The reverse paths $Pr_n$ are decided by linking the terminating ends of the decided forward paths $Pf_n$ and the starting ends of the next decided forward paths $Pf_{n+1}$ in order.

In FIG. 7, the travel path includes four forward paths $Pf_n$ and three reverse paths $Pr_n$. However, the number of forward paths $Pf_n$ and the number of reverse paths $Pr_n$ are not limited to the above example and may be different. Furthermore, when the material $S_k$ is larger than the capacity of the blade 18, the number of forward paths $Pf_n$ becomes more than one. However, when the material $S_k$ is smaller than the capacity of the blade 18, the number of forward paths $Pf_n$ may become one.

In step S106, the controller 31 controls the work machine 1 so as to perform the dumping work. The controller 31 causes the work machine 1 to move along the travel paths decided in step S105. The controller 31 controls the work machine 1 on the basis of the current position data and the travel paths.

Figure 8:
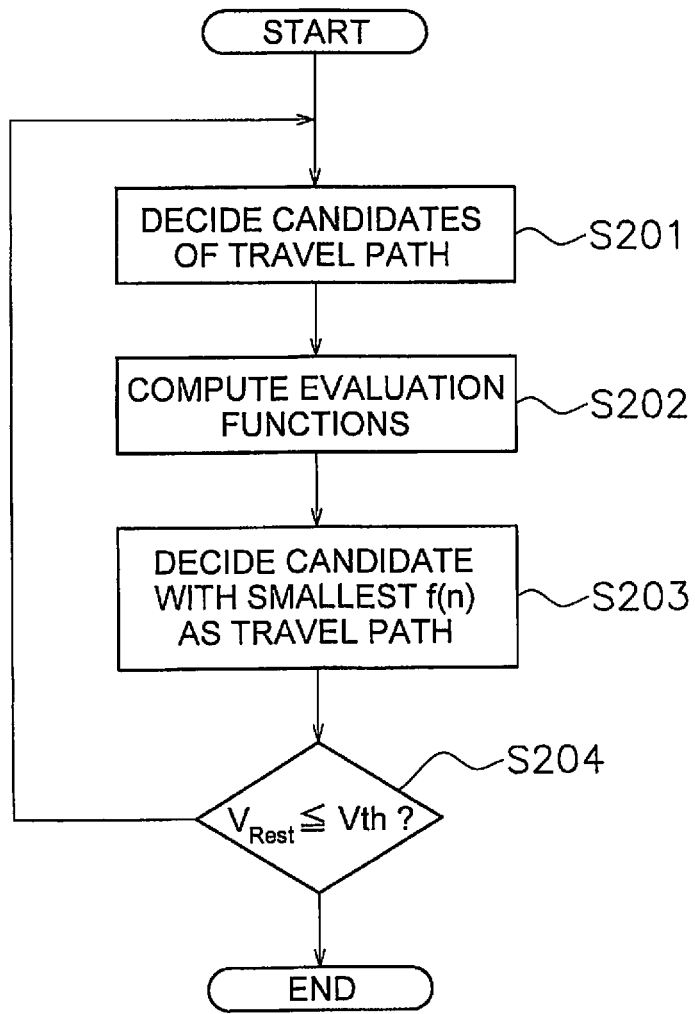
FIG. 8 is a flow chart illustrating processing of a travel path planning method.
Figure 9A:
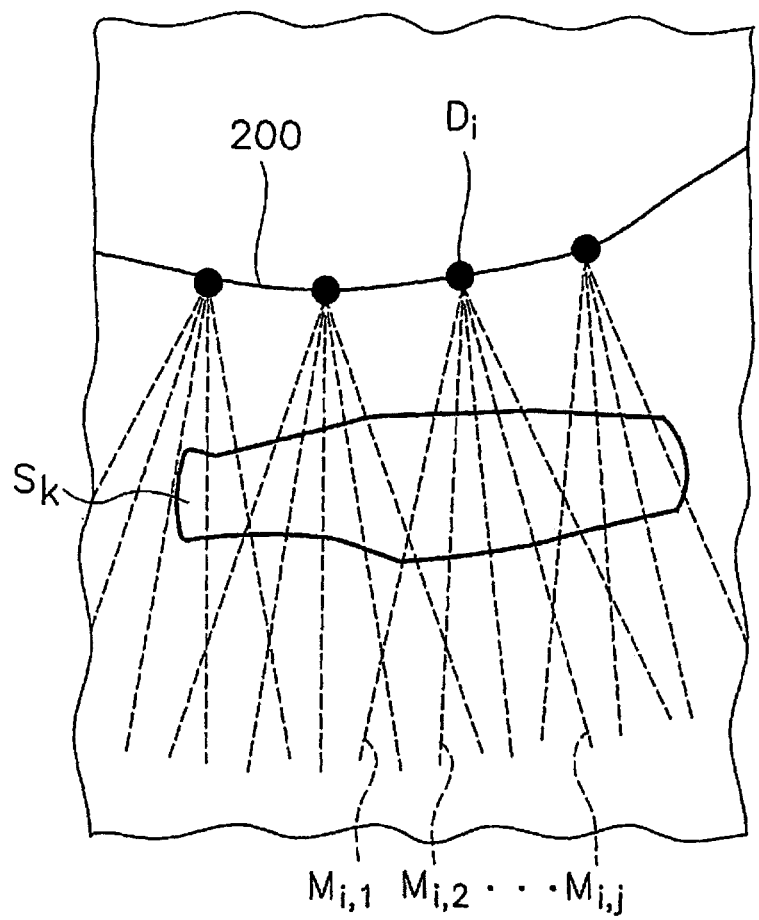
FIGS. 9A and 9B illustrate examples of travel path candidates.

The path planning method will be explained in detail next. FIG. 8 is a flow chart of a process of the path planning method executed by the controller 31. As illustrated in FIG. 8, in step S201, the controller 31 decides candidates $M_{i,j}$ of the travel path from the topographical data. As illustrated in FIG. 9A, the candidates $M_{i,j}$ of the travel path are defined by straight lines extending from each of the dumping positions $D_i$. The candidates $M_{i,j}$ of the travel path extend from the dumping positions $D_i$ within the range of a predetermined angle that includes the perpendicular direction from the edge 200 of the dumping area.

Figure 9B:
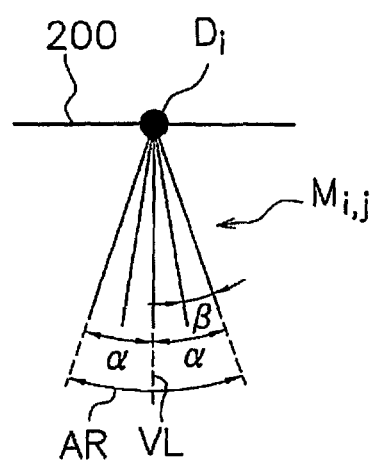

Specifically as illustrated in FIG. 9B, the candidates $M_{i,j}$ of the travel path extend in directions that differ from each other by a predetermined angle β within the predetermined angle range AR of ±α to the left and right centered on a perpendicular line VL. The perpendicular line VL is a straight line perpendicular to the edge 200 of the dumping area at the dumping position $D_i$. Preferably, the predetermined angle range AR is decided so that the left and right crawler belts 16 are both able to be in contact with the ground when the work machine 1 approaches the edge 200 of the dumping area. The predetermined angle β is, for example, 1 degree. However, the predetermined angle β may be larger than 1 degree or smaller than 1 degree. Preferably, the predetermined angle β is decided in consideration of the efficiency of the work and the calculation costs of the controller 31.

Figure 10:
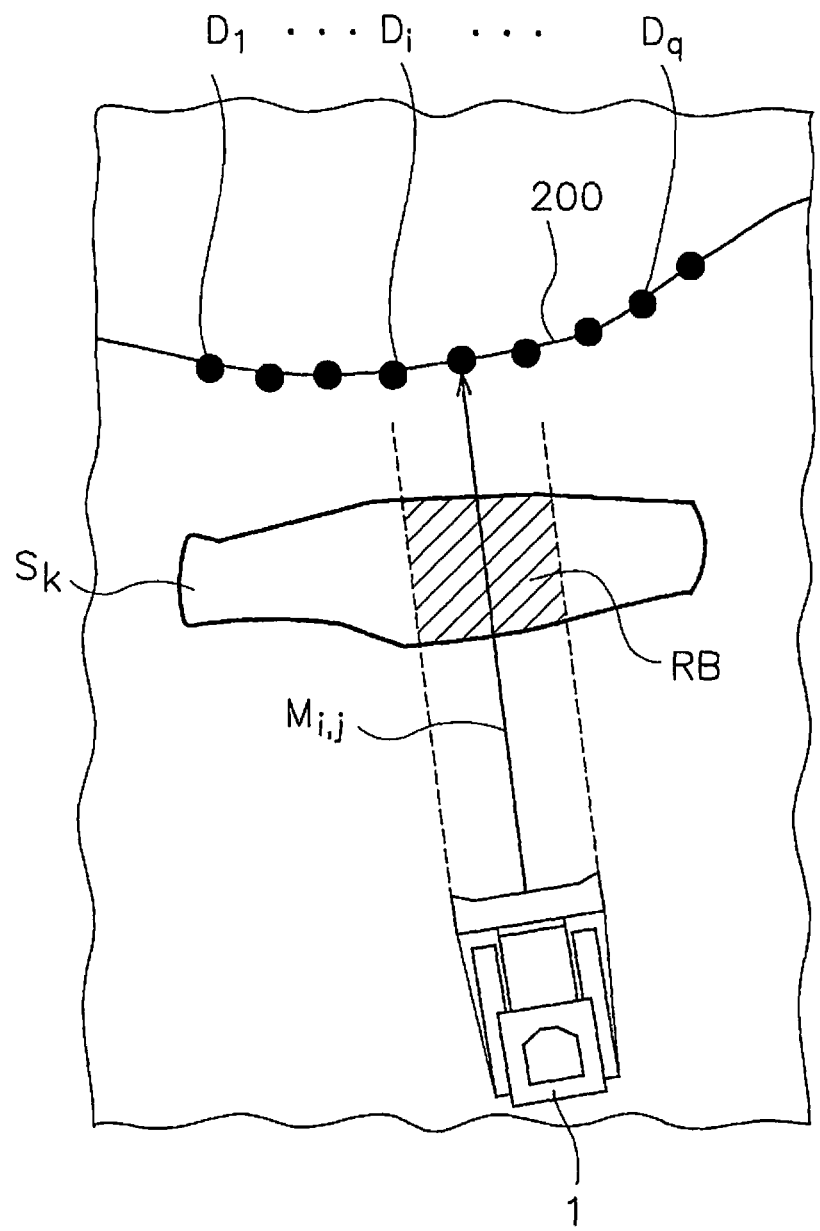
FIG. 10 illustrates a material function computation method.

The controller 31 selects the candidate $M_{i,j}$ of the travel path with which the material $S_k$ is held in an amount within a predetermined ratio of the capacity of the blade 18. As illustrated in FIG. 10, the controller 31 computes a range RB, in the material $S_k$, that overlaps the locus of the blade 18 along the travel path, and calculates the amount of the material $S_k$ that can be held with the blade 18 from the range RB.

The predetermined ratio range is a range from a lower limit R1 (%) to an upper limit R2 (%). The lower limit R1 of the predetermined ratio range is, for example, 40%. However, the lower limit R1 of the predetermined ratio range is not limited to 40% and may be higher or lower than 40%. The upper limit R2 of the predetermined ratio range is, for example, 90%. However, the upper limit R2 of the predetermined ratio range is not limited to 90% and may be higher or lower than 90%. Preferably, the predetermined ratio range is decided in consideration of the efficiency of the work and the calculation costs of the controller 31.

In step S202, the controller 31 computes evaluation functions with respect to each of the plurality of candidates $M_{i,j}$ from the material data. The evaluation function is a function of the A* search algorithm and is represented by the following equation (1).

$$f(n)=g(n)+h(n) \tag{1}$$

The time function g(n) is a time function which represents the work time of the work machine 1. h(n) is a material function which represents the remaining amount of the material $S_k$. g(n) and h(n) are normalized because the work time and the remaining amount of the material $S_k$ are parameters having different units. The ranges of fluctuation in the path evaluation processes of g(n) and h(n) can be made substantially the same as one another by normalizing. Because the weights of the normalized g(n) and h(n) are substantially the same, the evaluation function f(n) can be represented by equation (1). The time function g(n) and the material function h(n) are both made dimensionless amounts by normalizing. Therefore, the evaluation function f(n) is a dimensionless amount. Specifically, g(n) is represented by the following equation (2).

$$g(n)=T_{S-C}/T_{Total} \tag{2}$$

$T_{S-C}$ is the elapsed work time from the start position $ST_1$ to the dumping position $D_i$. $T_{Total}$ is a predictive value of the shortest work time. $T_{S-C}$ is represented by the following equation (3).

$$T_{S-C} = \sum_{i=1}^{n-1}(t_{i,P1-P2} + t_{i,P2-P3} + t_{i,P3-P4} + t_{i,P4-P5}) + \tag{3}$$
$$(t_{n,P1-P2} + t_{n,P2-P3} + t_{n,P3-P4})$$
$$(i = 1, 2, \ldots, n)$$

Figure 11:
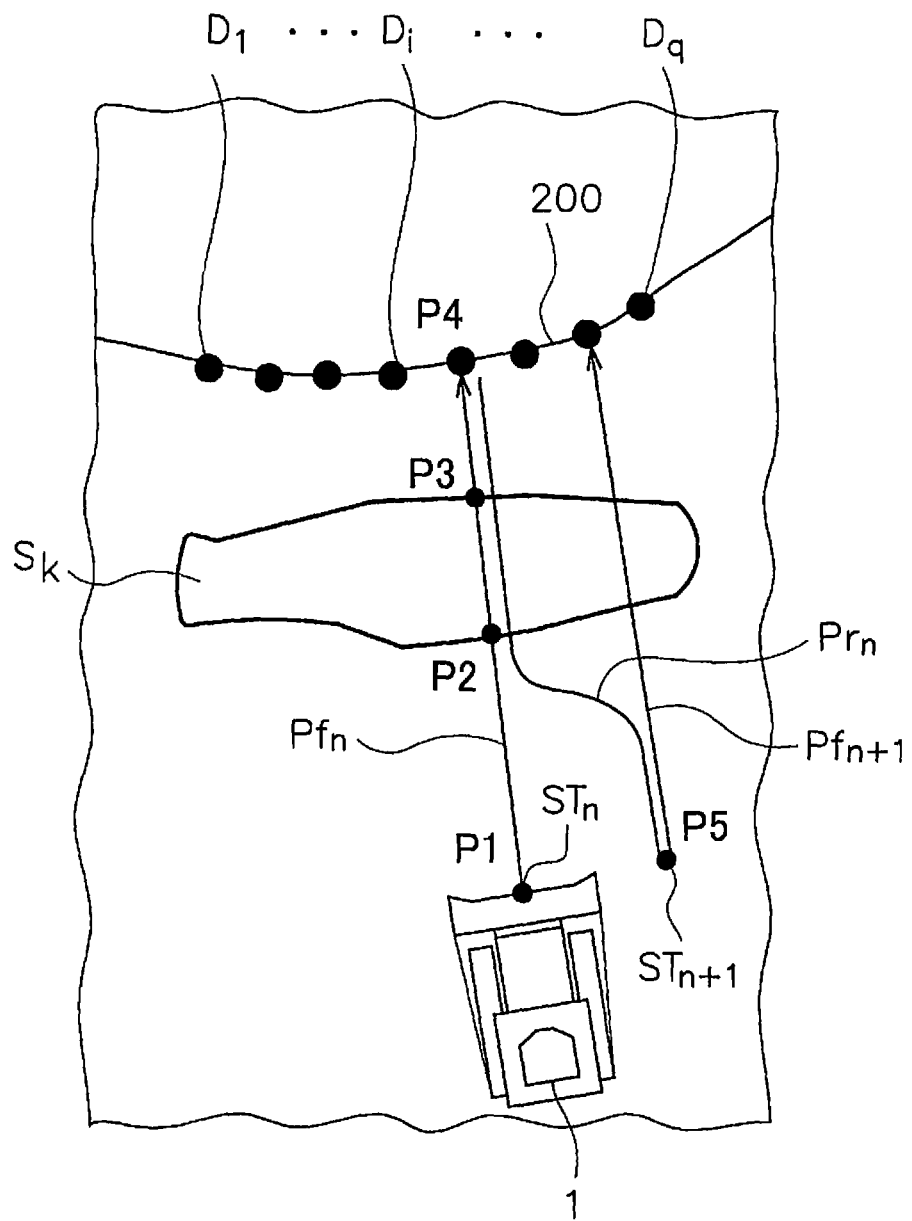
FIG. 11 illustrates a time function computation method.

As illustrated in FIG. 11, $t_{i,P1-P2}$ is the elapsed work time from P1 to P2. P1 to P2 is a step for approaching the material $S_k$ from the starting position $ST_n$ of the forward path $Pf_n$. $t_{i,P2-P3}$ is the elapsed work time from P2 to P3. P2 to P3 is the step in which the blade 18 is pushed into the material $S_k$. $t_{i,P3-P4}$ is the elapsed work time from P3 to P4. P3 to P4 is the step for moving from the material $S_k$ to the edge 200 of the dumping area. $t_{i,P4-P5}$ is the elapsed work time from P4 to P5. P4 to P5 is the step for reversing toward the starting position $ST_{n+1}$ of the next forward path $Pf_{n+1}$.

$t_{i,P1-P2}$ and $t_{i,P4-P5}$ can be calculated from the vehicle speed set by the controller 31 and from the movement distance. The load from the material $S_k$ increases in response to the movement of the work machine 1 in the step from P2 to P3. Therefore, $t_{i,P2-P3}$ can be calculated from the tractive force of the work machine 1, the amount of the material $S_k$ held by the blade 18, and the movement distance. $t_{i,P3-P4}$ can be calculated from the vehicle speed and the movement distance of the work machine 1 upon reaching P3.

$T_{Total}$ is represented by the following equation (4).

$$T_{Total} = (L_{nb} \times 2) \times \frac{V_{Ini}}{R3 \times V_{Capacity}} \div W_{foward} \tag{4}$$

$L_{nb}$ is the shortest distance to the edge 200 of the dumping area. $V_{Ini}$ is the initial amount of the material $S_k$. R3 is a predetermined ratio with respect to the capacity of the blade 18. R3 may be the same as the upper limit R2 of the abovementioned predetermined ratio range. $V_{Capacity}$ is the capacity of the blade 18. $W_{forward}$ is the forward vehicle speed of the work machine 1.

The material function h(n) is represented by the following equation (5).

$$h(n)=V_{Rest}/V_{Ini} \tag{5}$$

$V_{Rest}$ is the remaining amount of the material $S_k$. $V_{Ini}$ is the initial amount of the material $S_k$.

In step S203 as illustrated in FIG. 8, the controller 31 decides the candidate $M_{i,j}$ with the smallest evaluation function f(n) among the plurality of candidates $M_{i,j}$ as the nth travel path. That is, the controller 31 decides the candidate $M_{i,j}$ with the smallest evaluation function f(n) among the plurality of candidates $M_{i,j}$ as the nth forward path $Pf_n$. in the process for deciding the path with the smallest evaluation function f(n) as the travel path, the number of the decided travel paths is greater than n when a trace back is implemented.

The controller 31 decides a position spaced away by a predetermined distance from the material $S_k$ along the forward path $Pf_n$, as the starting position $ST_n$ of the nth forward path $Pf_n$. Alternatively, the controller 31 may set an arbitrary start line and decide an intersection of the start line and the forward path $Pf_n$ as the starting position $ST_n$ of the forward path $Pf_n$.

In step S204, the controller 31 determines whether the remaining amount $V_{Rest}$ of the material $S_k$ is equal to or less than a predetermined threshold $V_{th}$. The predetermined threshold $V_{th}$ is, for example, R1 (R1>0). When the material remaining amount $V_{Rest}$ is smaller than R1 when the threshold $V_{th}$ is R1, the threshold $V_{th}$ is updated to zero. Alternatively, the predetermined threshold $V_{th}$ may be set as a small value to a degree that assumes that substantially all of the material $S_k$ has been dumped. The threshold $V_{th}$ is preferably decided in consideration of work efficiency and the calculation costs of the controller 31.

When the remaining amount $V_{Rest}$ of the material $S_k$ is not equal to or less than the predetermined threshold $V_{th}$, the processing returns to step S201 and the controller 31 decides the next forward path $Pf_{n+1}$. When the remaining amount $V_{Rest}$ of the material $S_k$ is equal to or less than a predetermined threshold $V_{th}$, the controller 31 stops deciding the travel paths. That is, the controller 31 repeats deciding the travel paths until the remaining amount of the material $S_k$ is equal to or less than the predetermined threshold $V_{th}$.

Figure 12:
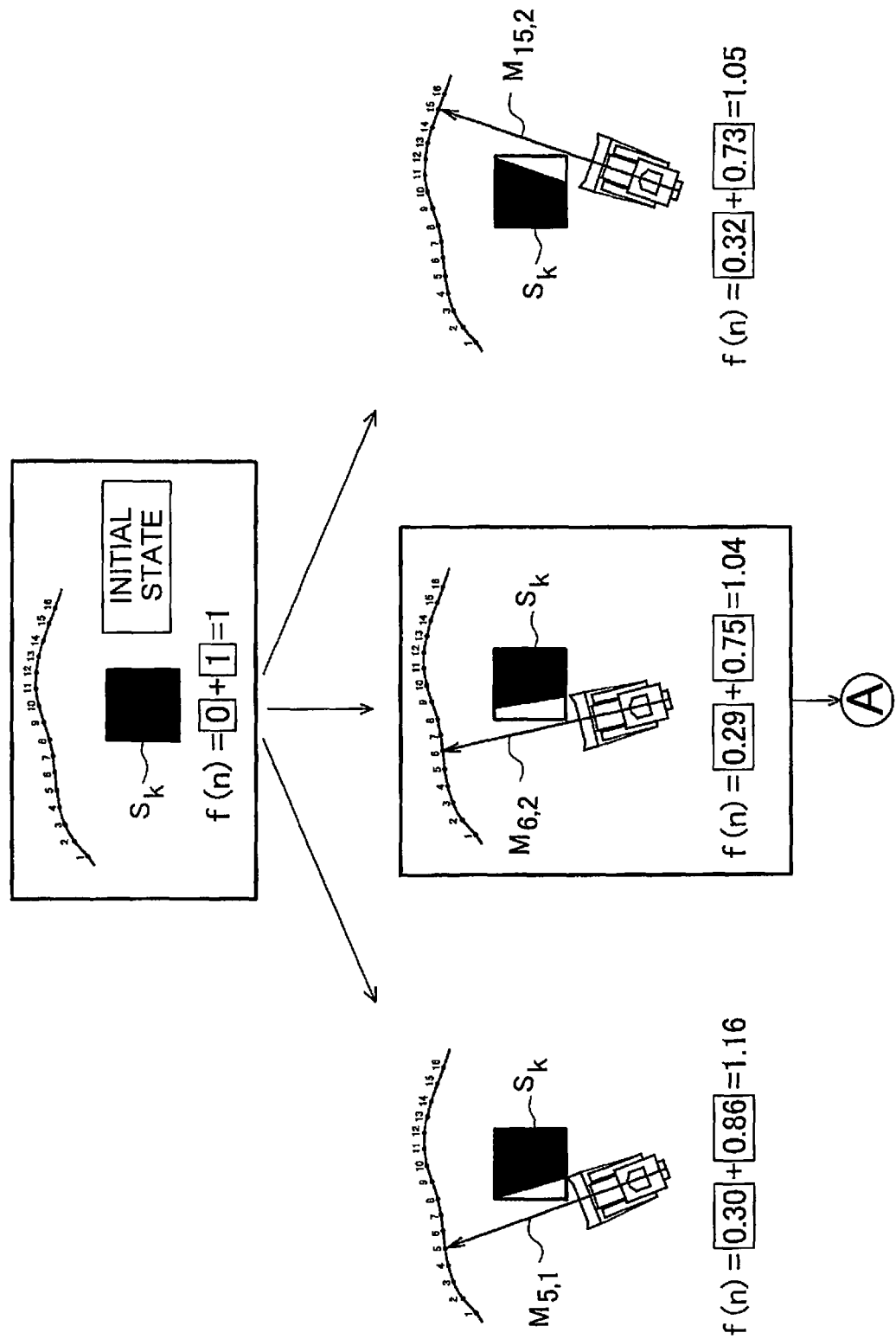
FIG. 12 illustrates a specific example of the travel path planning method.
Figure 13:
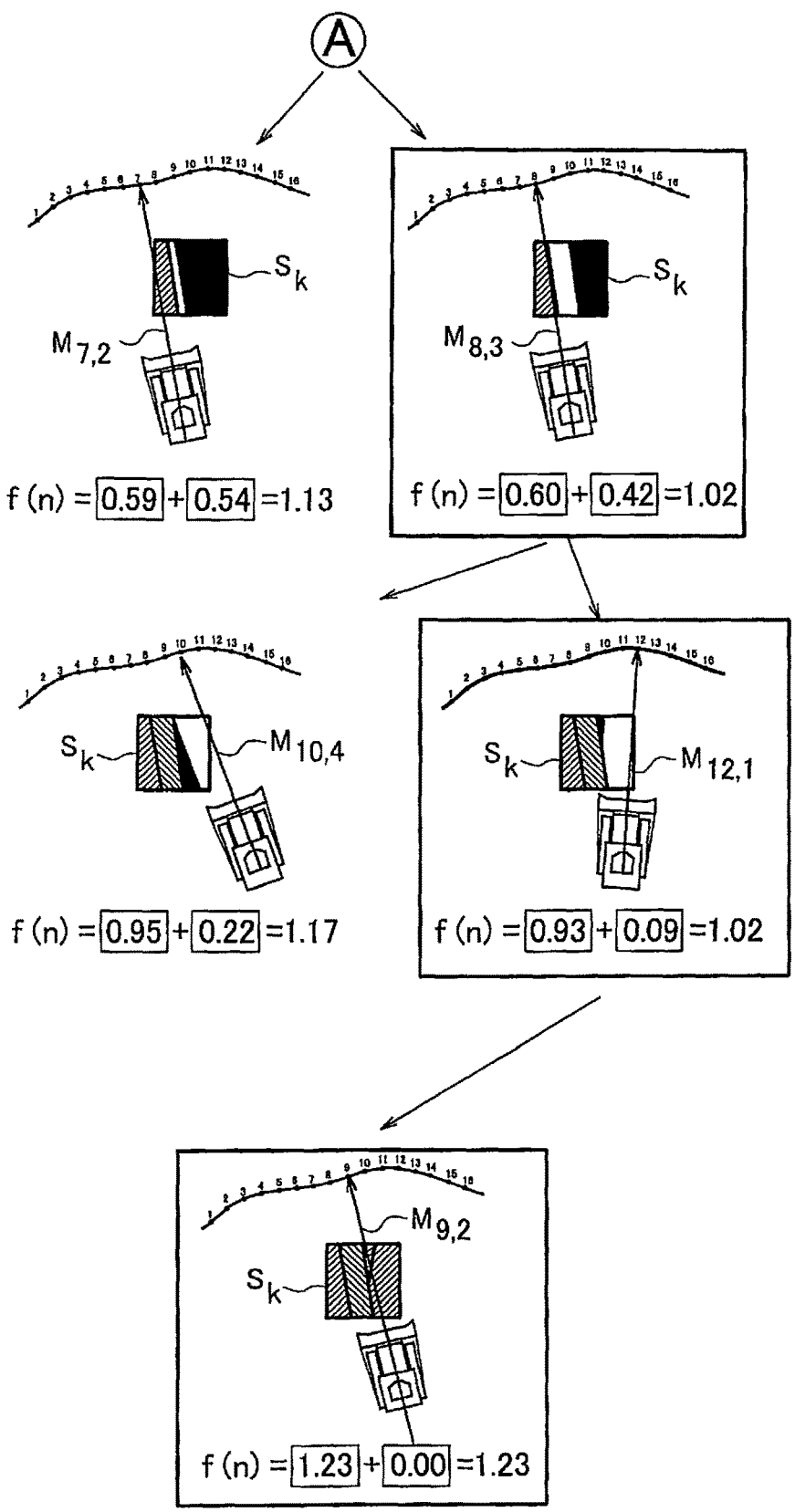
FIG. 13 illustrates a specific example of the travel path planning method.

A specific example of the path planning method by the controller 31 will be explained next. FIGS. 12 and 13 illustrate specific examples of the path planning method. The numerical values depicted in FIGS. 12 and 13 are examples and the present invention is not limited to the following values. Furthermore, only a portion of the candidates $M_{i,j}$ of the travel paths are depicted in FIGS. 12 and 13.

As illustrated in FIG. 12, the time function g(n) equals zero in the initial state because the work on the material $S_k$ has not started. Furthermore, the material function h(n)

equals one because all of the material $S_k$ is remaining. Therefore, the evaluation function f(n) equals one.

Next, the controller 31 decides candidates $M_{5,1}$ $M_{6,2}$ and $M_{15,2}$ as candidates $M_{i,j}$ of the first forward path $Pf_1$, and calculates the evaluation function f(n) for each of the candidates. The method for deciding the candidates is performed by selecting a travel path with which a material amount of a predetermined ratio range defined by R1 and R2, as indicated above, can be held. For example, in the candidate $M_{5,1}$, the time function g(n) equals 0.30 and the material function h(n) equals 0.86. In contrast, in the candidate $M_{6,2}$, the time function g(n) equals 0.29 and the material function h(n) equals 0.75. Therefore, the work time of the candidate $M_{6,2}$ is shorter than the candidate $M_{5,1}$ and the remaining amount of the material $S_k$ of the candidate $M_{6,2}$ is less than the candidate $M_{5,1}$. In addition, the evaluation function f(n) for the candidate $M_{5,1}$ equals 1.16 and the evaluation function f(n) for the candidate $M_{6,2}$ equals 1.04. The evaluation function f(n) for the candidate $M_{15,2}$ equals 1.05. Therefore, the controller 31 decides the candidate $M_{6,2}$ as the first forward path $Pf_1$ because the evaluation function f(n) thereof is the smallest among the candidates.

Next, as illustrated in FIG. 13, the controller 31 decides candidates $M_{7,2}$ and $M_{8,3}$ as the candidates $M_{i,j}$ of the second forward path $Pf_2$, and calculates the evaluation functions f(n) for each of the candidates. In the candidate $M_{7,2}$, the time function g(n) equals 0.59 and the material function h(n) equals 0.54. In contrast, in the candidate $M_{8,3}$, the time function g(n) equals 0.60 and the material function h(n) equals 0.42. Therefore, the work time of the candidate $M_{8,3}$ is longer than the candidate $M_{7,2}$ and the remaining amount of the material $S_k$ of the candidate $M_{8,3}$ is less than the candidate $M_{7,2}$. The evaluation function f(n) of the candidate $M_{8,3}$ is smaller than the candidate $M_{7,2}$. Therefore, the controller 31 decides the candidate $M_{8,3}$ as the second forward path $Pf_2$.

The controller 31 decides candidates $M_{10,4}$ and $M_{12,1}$ as the candidates $M_{i,j}$ of the third forward path $Pf_3$, and calculates the evaluation functions f(n) for each of the candidates. In the candidate $M_{10,4}$, the time function g(n) equals 0.95 and the material function h(n) equals 0.22. In contrast, in the candidate $M_{12,1}$, the time function g(n) equals 0.93 and the material function h(n) equals 0.09. Therefore, the work time of the candidate $M_{12,1}$ is shorter than the candidate $M_{10,4}$ and the remaining amount of the material $S_k$ of the candidate $M_{12,1}$ is less than the candidate $M_{10,4}$. The evaluation function f(n) of the candidate $M_{12,1}$ is smaller than the candidate $M_{10,4}$. Therefore, the controller 31 decides the candidate $M_{12,1}$ as the third forward path $Pf_3$.

The controller 31 decides candidate $M_{9,2}$ as the candidate $M_{i,j}$ of the fourth forward path $Pf_4$. The remaining amount of the material $S_k$ becomes zero with the candidate $M_{9,2}$. Therefore, the controller 31 decides the candidate $M_{9,2}$ as the fourth forward path $Pf_4$. The terminating end of the decided travel path is the terminating end of the forward path $Pf_4$ and is at a dumping position.

As described above, the controller 31 decides the candidates $M_{6,2}$, $M_{8,3}$, $M_{12,1}$ and $M_{9,2}$ respectively as the forward paths $Pf_1$ to $Pf_4$ and computes the reverse paths $Pr_1$ to $Pr_3$ that link the forward paths $Pf_1$ to $Pf_4$. The controller 31 then decides the forward paths $Pf_1$ to $Pf_4$ and the reverse paths $Pr_1$ to $Pr_3$ as the travel paths with respect to the material $S_k$.

As explained above, according to the control system 3 for the work machine 1 as in the present embodiment, the candidates having the smallest evaluation functions f(n) among a plurality of candidates $M_1$ of the travel paths are decided as the travel paths. As a result, suitable travel paths can be decided that are based on performing the work on the material $S_k$ without attributing a finish line which differs from the typical problem of searching for the shortest path.

The material function h(n) represents the remaining amount of the material $S_k$. As a result, suitable travel paths can be decided in order to more efficiently reduce the material $S_k$. Moreover, the evaluation function f(n) includes the time function g(n) which represents the work time of the work machine 1. As a result, suitable travel paths can be decided in order to perform the work more efficiently in a shorter work time.

The controller 31 decides the plurality of candidates $M_{i,j}$ of the travel paths so that the work machine 1 pushes the material $S_k$ in a straight line. That is, the forward path $Pf_n$ is defined as a straight line. As a result, the leakage of material from the blade 18 is reduced and travel paths that allow the work to be performed more efficiently can be decided. In addition, because the number of candidates $M_{i,j}$ of the travel paths is limited, the costs of the calculations performed by the controller 31 can be reduced.

Although one embodiment of the present invention has been described so far, the present invention is not limited to the above embodiment and various modifications may be made within the scope of the invention.

Figure 14:
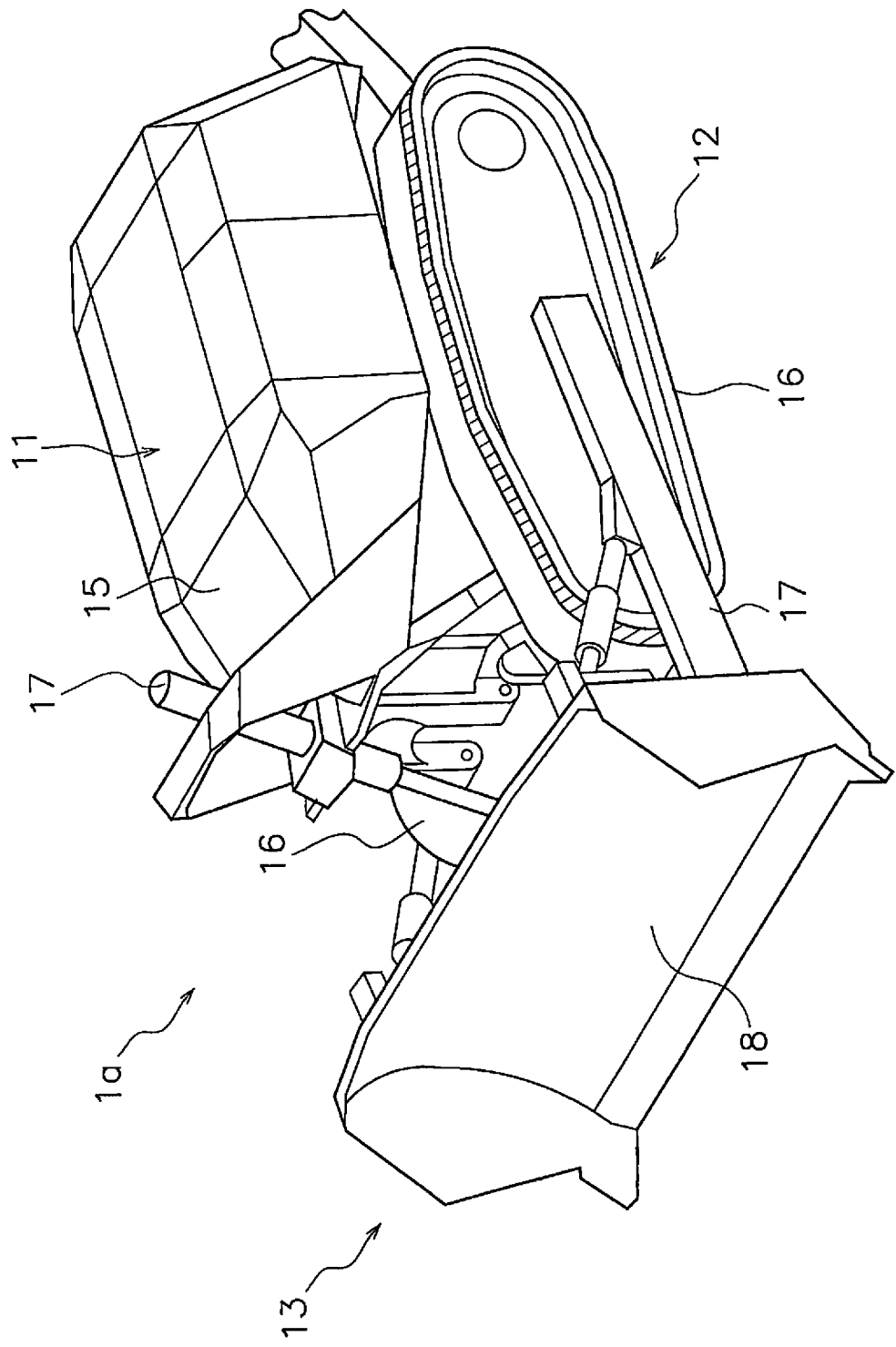
FIG. 14 is a perspective view of a work machine according to another embodiment.

The work machine 1 is not limited to a bulldozer, and may be another type of vehicle such as a wheel loader or the like. The work machine 1 may be a vehicle that can be remotely operated. In this case, the operating cabin may be omitted as in a work machine 1a illustrated in FIG. 14. The same reference numerals are used in FIG. 14 as in the configuration corresponding to the work machine 1 according to the above embodiment.

Figure 15:
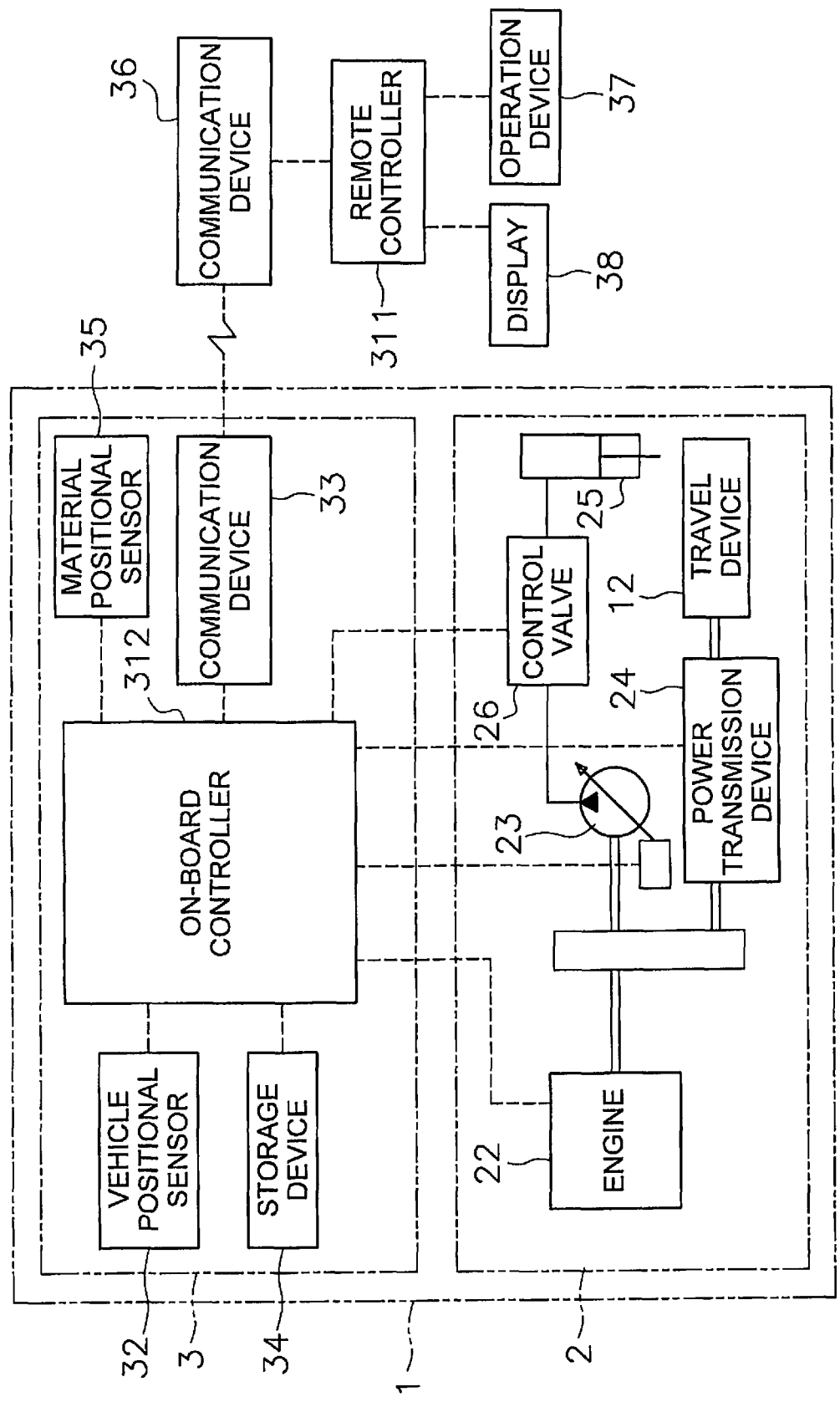
FIG. 15 is a block diagram of a configuration of the control system according to another embodiment.

A portion of the control system 3 may be disposed outside of the work machine 1. For example, the controller 31 may have a plurality of controllers separate from each other. For example as illustrated in FIG. 15, the controller 31 may include a remote controller 311 disposed outside of the work machine 1 and an on-board controller 312 mounted on the work machine 1. The remote controller 311 and the on-board controller 312 may be able to communicate wirelessly via communication devices 33 and 36. A portion of the above-mentioned functions of the controller 31 may be executed by the remote controller 311, and the remaining functions may be executed by the on-board controller 312. For example, the processing for determining the travel paths may be performed by the remote controller 311, and the process for executing the dumping work may be performed by the on-board controller 312.

The automatic control of the work machine 1 may be a semi-automatic control that is performed in accompaniment to manual operations by an operator. Alternatively, the automatic control may be a fully automatic control that is performed without manual operations by an operator. For example as illustrated in FIG. 15, the work machine 1 may be operated by an operator operating an operation device 37 disposed outside of the work machine 1. In this case, the forward travel the reverse travel, and turning of the work machine 1 may be operated with the operation device 37. Alternatively, a target point may be set with the operation device 37, and the work machine 1 may travel to the target point with the automatic control by the controller 31. Alternatively, the work machine 1 may travel using only the automatic control by the controller 31 without operations performed on the operation device 37.

Figure 16:
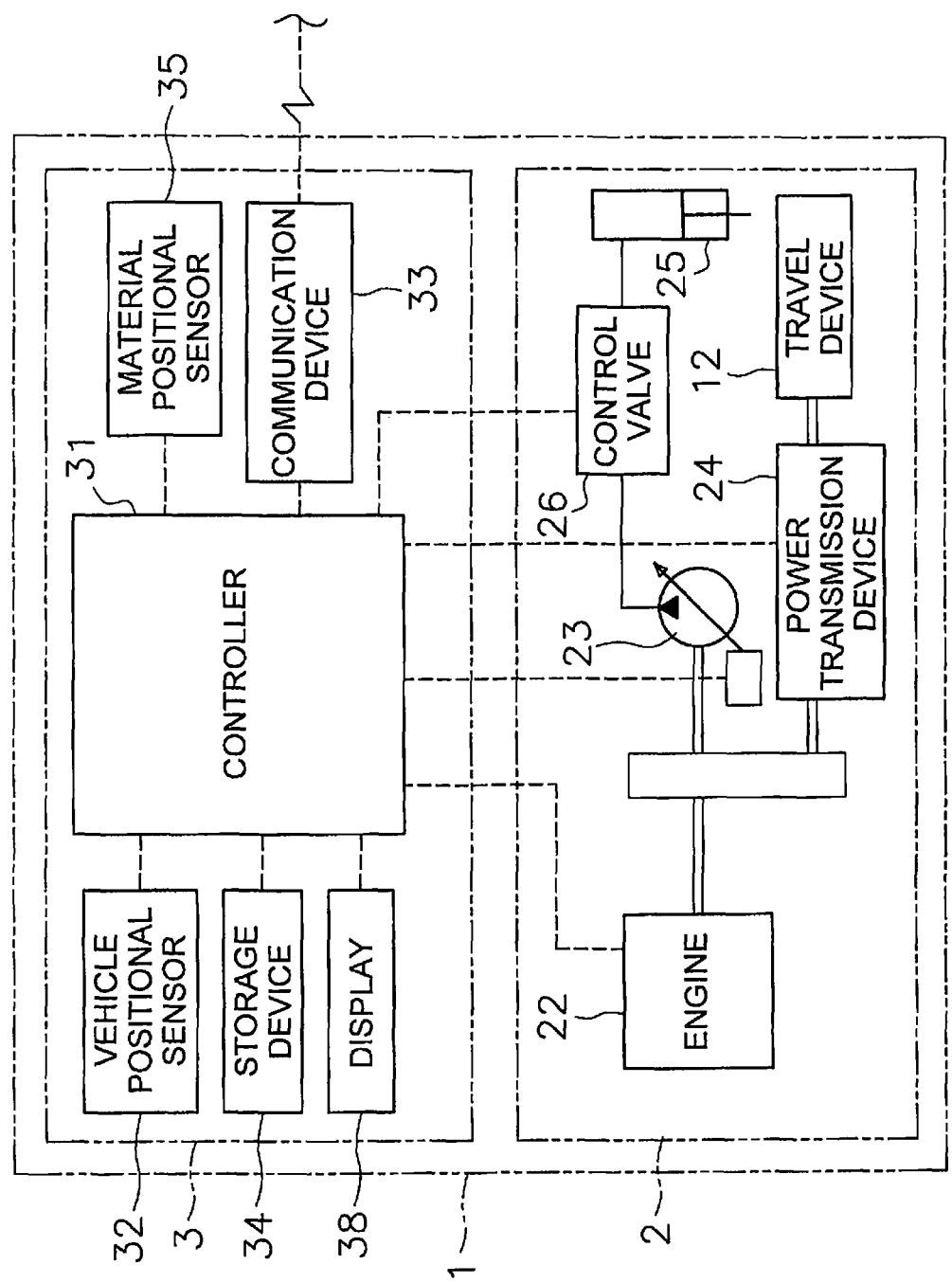
FIG. 16 is a block diagram of a configuration of the control system according to another embodiment.

The dumping work may be performed with an operation by an operator. For example as illustrated in FIG. 16, the work machine 1 may include a display 38. The travel path may be displayed on the display 38. In this case, the dumping work can be performed efficiently and easily by operating the work machine 1 following the travel paths displayed on the display 38 even if the operator has little experience. As illustrated in the example in FIG. 15, when the operation device 37 is disposed outside of the work machine 1, the display 38 may also be disposed outside of the work machine 1.

The path planning method is not limited to the above embodiment and may be changed. For example, the method is not limited to the A* search algorithm, and another algorithm such as the Dijkstra's algorithm or the greedy algorithm may be used in the path planning method.

The evaluation function is not limited to the work time and may include a function pertaining to another parameter. For example, the evaluation function may include a fuel function which indicates the fuel consumption amount of the work machine 1. In this case, the controller 31 is able to decide a travel path that reduces the fuel consumption amount while also reducing the remaining amount of the material $S_k$.

The evaluation function may include a function which indicates the travel distance of the work machine 1. In this case, the controller 31 is able to decide a travel path that reduces the travel distance while also reducing the remaining amount of the material $S_k$. By reducing the travel distance, fuel consumption and wear on the suspension components of the work machine 1 can also be reduced.

The controller 31 may update the material data after the work machine 1 travels along the travel path, and may determine the next travel path from the updated material data. In this case, even if the shape of the material $S_k$ changes due to the work, a suitable travel path can be decided in conjunction with the actual shape of the material $S_k$.

According to the present invention, a travel path for efficiently performing work with a work machine on a material at a work site can be suitably decided by a controller.

What is claimed is:

1. A system for planning a travel path of a work machine that is configured to work on a material at a work site, the system comprising:
   a controller configured to
   obtain topographical data indicating a topography of the work site,
   obtain material data indicating a position of the material,
   compute an evaluation function based on the material data for each of a plurality of candidates of the travel path to each of a plurality of dumping positions to be decided from the topographical data, the evaluation function including a material function pertaining to an amount of the material, each of the plurality of candidates of the travel path to one of the plurality of dumping positions being non-overlapping travel paths,
   decide a candidate having a smallest evaluation function of the plurality of candidates to each of the plurality of dumping positions as the travel path, and
   move the work machine along the travel path corresponding to the decided candidate.

2. The system according to claim 1, wherein the material function indicates a remaining amount of the material.

3. The system according to claim 1, wherein the evaluation function further includes a time function indicating a work time of the work machine.

4. The system according to claim 1, wherein the evaluation function further includes a fuel function indicating a fuel consumption amount of the work machine.

5. The system according to claim 1, wherein the evaluation function further includes a distance function indicating a travel distance of the work machine.

6. The system according to claim 1, wherein the evaluation function further includes a predetermined function relating to a parameter having a unit different from a unit of the amount of the material, and the material function and the predetermined function are normalized to be dimensionless amounts.

7. The system according to claim 1, wherein the topographical data includes data indicating a position at an edge of a dumping area at the work site, and the controller is further configured to decide the plurality of dumping positions along the edge of the dumping area, and decide the plurality of candidates of the travel path so as to pass through each of the plurality of dumping positions.

8. The system according to claim 1, wherein the topographical data includes data indicating a position at an edge of a dumping area at the work site, and the controller is further configured to decide the plurality of candidates of the travel path so that the work machine travels within a predetermined angle range, and the predetermined range includes a perpendicular direction to the edge of the dumping area.

9. The system according to claim 1, wherein the controller is further configured to decide the plurality of candidates of the travel path so that the work machine pushes the material in a straight line.

10. The system according to claim 1, wherein the controller is further configured to repeat the deciding of the travel paths until a remaining amount of the material is equal to or less than a predetermined value.

11. The system according to claim 1, wherein the controller is further configured to update the material data after the work machine travels along the travel path, and decide a next travel path from the updated material data.

12. The system according to claim 1, wherein the work machine includes a travel device, and the controller is further configured to control the travel device so that the work machine travels along the travel path.

13. The system according to claim 1, further comprising:
a display, the controller being further configured to display the travel path on the display.

14. A method executed by a controller for planning a travel path of a work machine configured to work on a material at a work site, the method comprising:
   obtaining topographical data indicating a topography of the work site;
   obtaining material data indicating a position of the material;
   computing an evaluation function based on the material data for each of a plurality of candidates of the travel path to each of a plurality of dumping positions to be decided from the topographical data, the evaluation function including a material function pertaining to an amount of the material, each of the plurality of candidates of the travel path to one of the plurality of dumping positions being non-overlapping travel paths;
   deciding a candidate having a smallest evaluation function of the plurality of candidates to each of the plurality of dumping positions as the travel path; and
   moving the work machine along the travel path corresponding to the decided candidate.

15. The method according to claim 14, wherein the material function indicates a remaining amount of the material.

16. The method according to claim 14, wherein the evaluation function further includes a time function indicating a work time of the work machine.

17. The method according to claim 14, wherein the evaluation function further includes a fuel function indicating a fuel consumption amount of the work machine.

18. The method according to claim 14, wherein the topographical data includes data indicating a position at an edge of a dumping area at the work site, and the method further comprises: deciding the plurality of dumping positions along the edge of the dumping area; and deciding the plurality of candidates of the travel path so as to pass through each of the plurality of dumping positions.

19. The method according to claim 14, wherein the travel path includes a forward path in which the work machine travels forward, and a reverse path in which the work machine travels in reverse, the plurality of candidates of the travel path is a plurality of candidates of the forward path, and deciding the travel path includes deciding the candidate having the smallest evaluation function as the forward path of the plurality of candidates of the forward path, and deciding the travel path that links a terminating end of the decided forward path and a starting end of the forward path next to the decided forward path.

20. The method according to claim 14, wherein the topographical data includes data indicating a position at an edge of a dumping area at the work site, and the method further comprises: deciding the plurality of candidates of the travel path so that the work machine travels within a predetermined angle range, the predetermined range including a perpendicular direction to the edge of the dumping area.

21. The method according to claim 14, further comprising: repeating the deciding of the travel paths until a remaining amount of the material is equal to or less than a predetermined value.

22. The method according to claim 14, further comprising: updating the material data after the work machine travels along the travel path, the deciding the travel path including deciding a next travel path from the updated material data.

23. A work machine comprising:
a controller usable to plan a travel path of the work machine, the work machine being configured to work on a material at a work site,
the controller being configured to
obtain topographical data indicating a topography of the work site,
obtain material data indicating a position of the material,
compute an evaluation function based on the material data for each of a plurality of candidates of the travel path to each of a plurality of dumping positions to be decided from the topographical data, the evaluation function including a material function pertaining to an amount of the material, the plurality of candidates of the travel path to one of the plurality of dumping positions being non-overlapping travel paths,
decide a candidate having a smallest evaluation function of the plurality of candidates to each of the plurality of dumping positions as the travel path, and
move the work machine along the travel path corresponding to the decided candidate.

* * * * *